Sept. 1, 1959            L. L. GATES            2,902,119
SAFETY BRAKE MECHANISM
Filed March 6, 1957
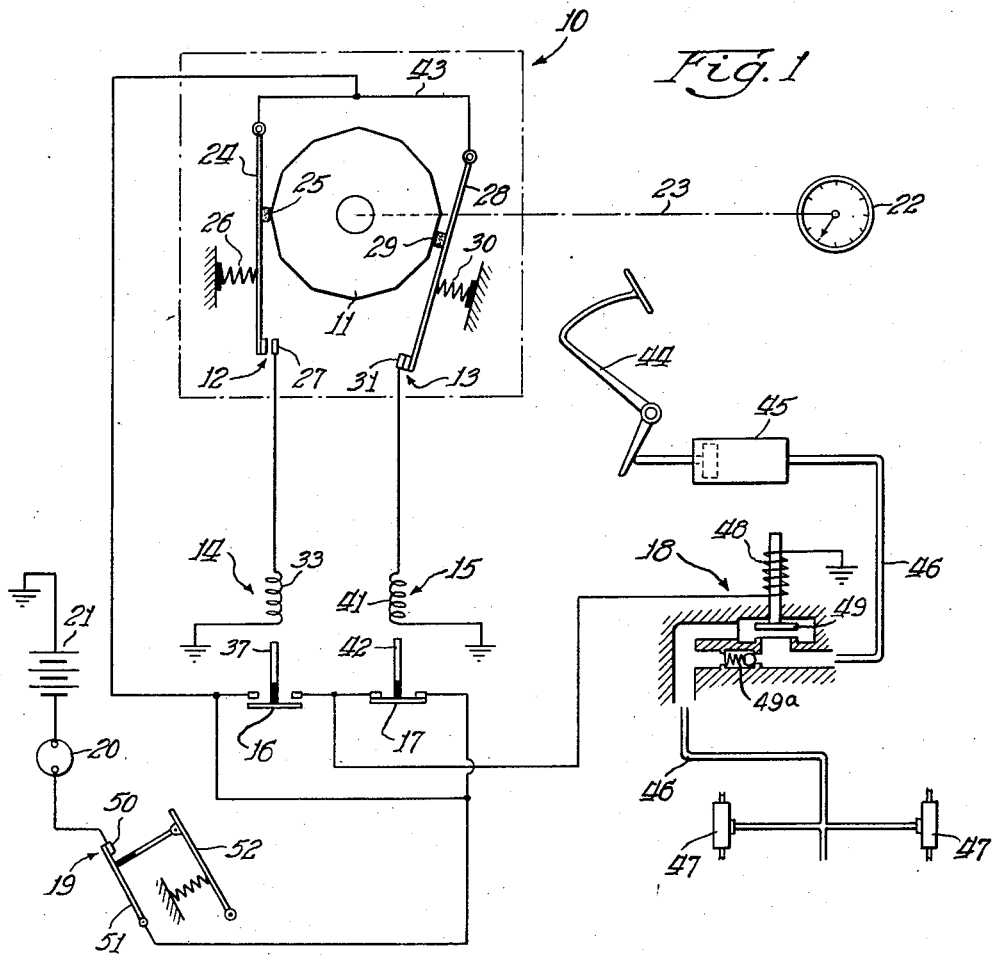
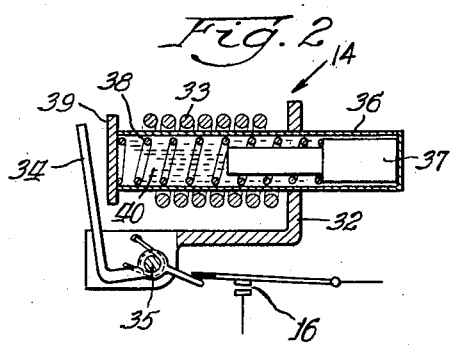
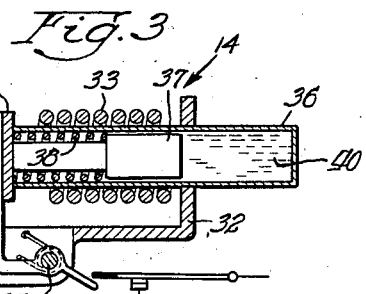
Inventor:
Lyna L. Gates
By:
Donald W. Banner, Atty.

United States Patent Office 2,902,119
Patented Sept. 1, 1959

2,902,119

SAFETY BRAKE MECHANISM

Lyna Lawrence Gates, Detroit, Mich., assignor to Borg-Warner Corporation, Chicago, Ill., a corporation of Illinois Application March 6, 1957, Serial No. 644,376

3 Claims. (Cl. 188—152)

This invention relates to braking mechanisms for automotive vehicles, and more particularly to control means adapted to automatically lock the brakes of an automotive vehicle after said brakes are applied and said vehicle has substantially come to rest.

Brake control means commonly known as "anti-creep" or "no-roll" devices are well known in the art. Such devices normally include hydraulic control means for locking the brakes of an automotive vehicle, and often include motion responsive inertia switches adapted to operate such hydraulic control means. Many such devices suffered from defects in operation; e.g., the brakes locking while the vehicle was in motion, or the brakes failing to unlock when the vehicle tended to be set in motion. The major weakness in such prior art devices was the failure to provide a motion detection element that would accurately sense any motion of the vehicle.

It is, therefore, an object of the present invention to provide new and improved motion sensitive control means adapted automatically to trap the fluid in the brake lines of an automotive vehicle after said brakes are applied and said vehicle has substantially come to rest.

It is an additional object to provide control means including a time delay relay adapted automatically to trap the fluid in the brake lines of an automotive vehicle only when vehicle motion has substantially ceased.

It is a further object of the present invention to provide control means comprising two time delay relays and two electric contact switches adapted to prevent locking of the vehicle brakes while said vehicle is in motion and adapted automatically to trap the fluid in the brake lines when said vehicle has substantially come to rest.

The invention consists of the novel constructions, arrangements, and device to be hereinafter described and claimed for carrying out the above stated objects and such other objects as will be apparent from the following description of preferred forms of the invention, illustrated with reference to the accompanying drawings, wherein:

Figure 1 is a diagrammatic illustration of a new and improved control system embodying the principles of the invention;

Figure 2 is a diagrammatic side view of a time delay relay, in a non-energized condition, adapted to be incorporated with the present invention;

Figure 3 is a view of the time delay relay in an energized condition.

Like characters of reference designate like parts in the several views.

Referring to the figures, there is illustrated a control mechanism 10 embodying the principles of the invention and comprising: a twelve lobe cam 11, two sets of breaker points 12 and 13, and two time-delay relays 14 and 15 having switches 16 and 17 operated by the relays 14 and 15. The control mechanism 10 further comprises an electrical circuit which includes a solenoid operated valve 18, an accelerator switch 19, an ignition switch 20, and a battery 21.

The cam 11 is mounted for rotation by a conventional speedometer drive means 23 so that the angular speed of rotation of the cam 11 is directly proportional to vehicle speed; and the vehicle speedometer 22 is driven by means of a cable 23 connected to the drive means 23.

The set of breaker points 12 comprises a pivotally mounted contact arm 24 of conducting material carrying an insulated extension 25 in engagement with the external surface of the cam 11. The extension 25 is pressed against the cam 11 by a spring 26, and arm 24 is caused to make and break contact with a fixed contact 27 as the cam 11 is rotated.

The set of breaker points 13 comprises a contact arm 28 carrying an insulated extension 29, a spring 30, and a fixed contact 31. The set of points 13 is identical in construction to the points 12 but is disposed with respect to the cam 11 in such a position that the points 13 will be closed when the points 12 are open, and vice versa, with a slight overlap of a few degrees of rotation to ensure that one set is always closed.

The time delay relay 14 (Figure 2) comprises a supporting frame 32 of suitable magnetic material, a solenoid 33, an armature 34 pivotally mounted on the frame 32 by a pin 35, a sealed hollow cylindrical core 36 of non-magnetic material, a movable core 37 of magnetic material and a bias spring 38 disposed within the hollow core 36, an armature plate 39 mounted on the end of the core 36 nearest to the armature 34 and a switch 16. The movable core 37 and the spring 38 are immersed in a silicon fluid 40 of high viscosity within the sealed core 36.

The time delay relay 15 is identical in construction to the relay 14 and comprises a solenoid 41 and an armature 42 adapted to close the switch 17 when the solenoid 41 is energized.

The source of E.M.F. for energizing the relays 14 and 15 is the vehicle battery 21 which is connected through the ignition switch 20, and the accelerator switch 19 to a common electrical terminal 43 for the contact points 12 and 13. The points 12 and the relay 14 form one branch of a parallel network connected between the terminal 43 and ground. The points 13 and the relay 15 form a second branch of this parallel circuit between the terminal 43 and ground. It is apparent that opening either the ignition switch 20 or the accelerator switch 19 will de-energize the entire circuit.

The hydraulic braking mechanism for the vehicle generally comprises a brake pedal 44, a master cylinder 45, a fluid line 46, and a plurality of brake shoe operating cylinders 47. Depressing the brake pedal 44 creates fluid pressure within the master cylinder 45 which is transmitted through the fluid brake line 46 to the respective wheel cylinders 47 for applying the brakes.

The solenoid valve 18 comprises an electrical solenoid 48 and a valve 49 adapted to be closed by the solenoid 48 when energized. The valve 49 is of the one-way type; that is, it is effective when closed to prevent fluid flow out of the portion of the fluid line 46 seen to the left of valve 49 in Figure 1. Fluid passage past the valve 49 is afforded by ball check valve 49a in a manner conventional in valves of this type. This one-way feature is important to permit application of the brakes at all times. Solenoid valves of this type are well known in the art and will not be further described.

The solenoid valve 18 is connected in an electrical circuit comprising the battery 21, the ignition switch 20, the accelerator switch 19, a parallel circuit including the switch 16 in one branch and the switch 17 in the other branch, and the solenoid 48. It is apparent that this circuit is completed only when the ignition switch 20 is closed, the accelerator switch 19 is closed, and either one of the switches 16 or 17 is closed.

The accelerator switch 19 comprises a fixed contact 50 and a pivotally mounted contact arm 51. The contact arm 51 is attached directly to the vehicle accelerator pedal 52, and any depression of the accelerator pedal 52 is effective to open the switch 19.

The ignition switch 20 can be of any conventional type effective to complete an electric circuit through the vehicle ignition system.

The operation of the control mechanism 10 in conjunction with the hydraulic brake system is as follows:

With the vehicle in motion and with the engine running, when it is desired to stop the vehicle, the accelerator pedal 52 is released closing the switch 19 and the brake pedal 44 is depressed creating a fluid pressure within the master cylinder 45 which is transmitted through the brake line 46 to the wheel cylinder 47 for applying the brakes. The fluid pressure thus created within the brake line 46 can be trapped, in the manner described, by energizing the solenoid 48 of the solenoid valve 18 so as to close the valve 49. The brakes thus applied remain locked until the solenoid 48 is de-energized and the valve 49 allowed to open. The solenoid 48 can be de-energized instantly, and the valve 49 opened, by de-pressing the accelerator pedal 52, which is effective to open the accelerator switch 19 connected in series with the solenoid 48.

It is apparent that for effective operation of this brake mechanism that the brakes of the vehicle should not be locked until the vehicle has substantially come to rest. It is necessary, therefore, that the solenoid 48 shall not be energized until vehicle motion has substantially ceased. With the accelerator switch 19 closed by release of the accelerator pedal 52 and the ignition switch 20 closed, it is only necessary to close either the switch 16 or 17 to energize the solenoid 48. The switches 16 and 17 are closed by means of the solenoids of the time delay relays 14 and 15, respectively. The solenoid 33 of the relay 14 is energized only when the contact points 12 are closed, and the solenoid 41 of the relay 15 is energized only when the points 13 are closed. The rotation of the cam 11 is effective to alternately make and break contact of the points 12 and 13. Because of the time delay factor inherent in both of the relays 14 and 15, the switches 16 and 17 do not close until current flows through the solenoids 33 or 41 for a time that is greater than the time delay factor. With the cam 11 rotating at a substantial angular velocity either of the points 12 or 13 will be closed for only very short periods of time. Because of the time delay factor, the pulses of current flowing though the solenoids 33 and 41 are ineffective to close the switches 16 or 17 until the rotation of the cam 11 has substantially ceased and one of the points 12 or 13 is closed for a period sufficient to effect operation of the associated time delay relay. In the preferred embodiment of the present invention, it has been found desirable to incorporate a time delay of from ¼ to ¾ second, that is, current must flow continuously through either the solenoid 33 or 41 for this time to close the corresponding switch 16 or 17.

The double set of points and double relay system is provided to insure that when rotation of the cam 11 has substantially ceased one of the sets of points 12 or 13 is closed and its associated relay is energized.

The time delay of the relays 14 and 15 is provided as follows, (reference being had to Figures 2 and 3, particularly):

When the solenoid 33 is de-energized, the spring 38 is effective to hold the movable core 37 to the extreme right of the hollow core 36 beyond the end of the solenoid 33. The solenoid 33 is energized by passing a direct current through it and a magnetic field is created axially through the solenoid 33 according to well known principles. The field thus created is effective to attract the core 37 and draw it into the center of the solenoid 33 against the force of the spring 38. The movement of the core 37 is slowed down by the viscous silicon fluid 40 which must be displaced between the outer surface of the core 37 and the inner surface of the core 36.

The magnetic field created by the energized solenoid 33 establishes a magnetic circuit through the movable core 37, the supporting frame 32, the armature 34, and the armature plate 39. As the core 37 moves toward the center of the coil 33, the air gap between the core 37 and the armature 34 is decreased, thereby reducing the reluctance of the magnetic field. When the movable core 37 touches the armature plate 39, the magnetic circuit is complete and a considerable increase in magnetic flux occurs. At this time, the armature 34 is attracted to the armature plate 39 and the movement of the armature 34 is effective to close the switch 16. The operation of the relay 15 is substantially identical to that of the above described relay 14, and the relay 15 is effective to close the switch 17 when energized for a time greater than the time delay factor.

A relay of the type described is manufactured by the Heinemann Electric Company, of Compton, New Jersey and is described in a bulletin, No. T–5002, dated June 1955. However, other relays of different manufacture that would accomplish the desired time delay function would work equally well in this invention.

It is apparent that this invention has many advantages not shown in the existing prior art devices. Primarily, the present invention has provided a motion sensitive element, in conjunction with a simple time delay relay, that is effective to prevent undesirable locking of the brakes. This feature is particularly important in view of the obvious hazards involved should the brakes lock while the vehicle is in any appreciable motion, as for example, when the vehicle was being driven on an icy or slippery surface.

It is to be understood that my invention is not to be limited to the specific constructions and arrangements shown and described, except only insofar as the claims may be so limited, as it will be understood to those skilled in the art, that changes may be made without departing from the principles of the invention.

I claim:

1. In an anti-creep mechanism for a vehicle having rotatable wheels and a hydraulic brake system operable to stop rotation of the wheels, the combination of a rotatable cam responsive to wheel motion, electrical contact switch means including a pair of contact switches, said rotatable cam being positioned to effect alternative opening and closing of said contact switches, electrical time delay means including a pair of delayed action electrical relays connected in circuit with said contact switches, the switch of each relay being normally open, each of said delayed action electrical relays being respectively operable when energized to close its normally open relay switch after a predetermined period of time, and an electrical solenoid valve positioned in the brake system to prevent the release of brake applying fluid pressure from the hydraulic brake system and connected to the output side of both of said relay switches.

2. In an anti-creep mechanism for a vehicle having rotatable wheels and a hydraulic brake system operable to stop rotation of the wheels, the combination of a rotatable multiple-lobe cam responsive to wheel motion, electrical contact switch means including a pair of contact switches, said rotatable cam being positioned to effect alternative opening and closing of said contact switches, electrical time delay means including a pair of delayed action electrical relays connected in circuit with said contact switches, the switch of each relay being normally open, said electrical relays each having a movable armature operable to close its normally open relay switch after said relay has been energized for a predetermined period of time, said contact switch means being operable upon energization to actuate either of said relays, and an electrical solenoid valve positioned in the brake system to prevent the release of brake applying fluid pressure from the hydraulic brake system and connected to the output side of both of said relay switches.

3. In an anti-creep mechanism for a vehicle having rotatable wheels and a hydraulic brake system operable to stop rotation of the wheels, the combination of a rotatable cam responsive to wheel motion and having a plurality of lobes, electrical contact switch means including a pair of contact switches, each of said contact switches comprising a spring loaded arm in contact with said cam in a manner that rotation of said cam affords alternative opening and closing thereof, electrical time delay means including a pair of delayed action electrical relays connected in circuit with said contact switches, the switch of each relay being normally open, each of said electrical relays having a movable armature positioned to effect closing of one of said normally open switches after said respective relays has been energized for a predetermined period of time, and an electrical solenoid valve positioned in the brake system to prevent the release of brake applying fluid pressure from the hydraulic brake system and connected to the output side of both of said relay switches, each of said normally open relay switches being connected in a branch of a parallel electrical circuit having a common terminal connected to said solenoid valve.

References Cited in the file of this patent
UNITED STATES PATENTS

| | | |
|---|---|---|
| 2,594,155 | Guernsey et al. | Apr. 22, 1952 |
| 2,637,416 | Guernsey et al. | May 5, 1953 |
| 2,642,484 | Price | June 16, 1953 |
| 2,701,035 | Leichsenring | Feb. 1, 1955 |